(12) United States Patent
Meshenky

(10) Patent No.: US 6,764,279 B2
(45) Date of Patent: Jul. 20, 2004

(54) INTERNALLY MOUNTED RADIAL FLOW INTERCOOLER FOR A ROTARY COMPRESSOR MACHINE

(75) Inventor: Steven P. Meshenky, Racine, WI (US)

(73) Assignee: Modine Manufacturing Company, Racine, WI (US)

( * ) Notice: Subject to any disclaimer, the term of this patent is extended or adjusted under 35 U.S.C. 154(b) by 3 days.

(21) Appl. No.: 10/256,863

(22) Filed: Sep. 27, 2002

(65) Prior Publication Data

US 2004/0062644 A1 Apr. 1, 2004

(51) Int. Cl.[7] ............................................... F01D 25/12
(52) U.S. Cl. ..................... 415/179; 415/211.2; 165/125
(58) Field of Search ................. 415/175, 177, 415/178, 179, 211.2, 208.3; 165/121, 122, 125

(56) References Cited

U.S. PATENT DOCUMENTS

| | | | |
|---|---|---|---|
| 2,650,073 A | | 8/1953 | Holm |
| 2,925,954 A | * | 2/1960 | Spillmann et al. ........... 415/179 |
| 4,062,401 A | | 12/1977 | Rudny et al. |
| 4,125,345 A | * | 11/1978 | Yoshinaga et al. .......... 417/243 |
| 4,550,775 A | | 11/1985 | Edwards et al. |
| 4,706,736 A | | 11/1987 | Gyori |
| 5,077,601 A | | 12/1991 | Hatada et al. |
| 5,078,206 A | | 1/1992 | Goetz, Jr. |
| 5,172,752 A | | 12/1992 | Goetz, Jr. |
| 5,303,770 A | | 4/1994 | Dierbeck |
| 5,402,656 A | | 4/1995 | Jaster et al. |
| 5,704,211 A | | 1/1998 | Hatfield |
| 6,170,568 B1 | | 1/2001 | Valenzuela |
| 6,173,493 B1 | | 1/2001 | Dierbeck |
| RE37,134 E | | 4/2001 | Wilson |
| 6,526,751 B1 | | 3/2003 | Moeckel ...................... 60/599 |

FOREIGN PATENT DOCUMENTS

EP          0 135 365 A2      3/1985

* cited by examiner

Primary Examiner—Edward K. Look
Assistant Examiner—Dwayne J. White
(74) Attorney, Agent, or Firm—Wood, Phillips, Katz, Clark & Mortimer

(57) ABSTRACT

Improved efficiency is obtained in a rotary machine having a rotary shaft (18) mounting a compressor wheel (20) that discharges into a heat exchanger (36) having a core (82) with a central opening (42) in surrounding relation to the shaft (18). The heat exchanger (36) includes a coolant tank (90) on one side of the core (82) and in fluid communication with the same which serves as one boundary of radially extending space (68) through which a gas is discharged by a compressor wheel (20). A deswirling vane structure (80) causes gas discharged by the compressor wheel (22) to move radially outward within the space (68) and is formed of a material of good thermal conductivity and thermally bridged to the tank (90) to conduct heat thereto to be rejected to coolant in the tank.

8 Claims, 4 Drawing Sheets

INTERNALLY MOUNTED RADIAL FLOW INTERCOOLER FOR A ROTARY COMPRESSOR MACHINE

FIELD OF THE INVENTION

This invention relates to a heat exchanger used as an inter-cooler in a rotary compressor machine such as a turbocharger or a super-charger for engines.

BACKGROUND OF THE INVENTION

Combustion air chargers, such as turbochargers or superchargers, have been employed with engines, particularly internal combustion engines, for many years. In a turbocharger, at least one rotary compressor wheel is driven by the exhaust of the engine. In the case of a supercharger, at least one rotary compressor wheel is driven mechanically, usually by the rotary output of the engine. In either case, a compressor wheel is employed to compress ambient air prior to its admission to the engine to support combustion therein. Because the air is compressed, a given volume thereof will have a greater mole content of oxygen than an otherwise equal of volume of air at ambient pressure. As a consequence, the additional oxygen permits the combustion of a greater quantity of fuel so that for a power plant of a given size, a greater power output may be derived as a result of the charging of the combustion air.

Over the years, it has been determined that the efficiency of such combustion air charging devices can be improved through the use of a so-called intercooling system. Because the air is heated as it is compressed, part of the efficiency derived by employing the combustion air charging device in the first place, i.e., the densification of the combustion air charged to the engine, is lost because a volume of hot compressed air will contain less oxygen than an equal volume of cooler compressed air when both are at the same pressure. Thus, for a given pressure, upon admission to an engine for combustion, a cooler combustion air charge will allow the development of more power within the engine than the same charge at the same pressure if at a higher temperature.

Consequently, intercoolers as mentioned previously have been employed to cool the air after it exits the combustion air charger (or a stage thereof) and prior to its admission to the engine so as to provide, for any given pressure, a maximum mole content of oxygen.

In many cases, the intercooler will be employed as a conventional, rectangular-shaped heat exchanger and is mounted side-by-side or to the front or rear of the usual heat exchanger employed for cooling engine coolant. While this sort of an arrangement adequately handles the cooling of the pressurized combustion air, it may have certain constraints in terms of size and the volume available in an engine compartment as, for example, in a vehicle, that houses both the engine and the various heat exchangers employed for cooling. It also may require extensive hose connections between the turbocharger, the intercooler and the engine combustion air inlet which necessarily require relatively large diameter hoses because of the low density of the combustion air and the consequent large volume thereof.

It has therefore been proposed to incorporate the intercooler within the combustion air charger itself to provide a more compact combustion air charging and intercooling system as well as to avoid large, bulky hose connections to the extent possible. The goal here is to incorporate the intercooling heat exchanger within the combustion air charger in such a way that it may be easily serviced, requires a minimum of plumbing connections and does not unduly increase the bulk of the combustion air charger while at the same time maximizing the cooling of the combustion air after compression thereof.

The present invention is directed toward the provision of advantageous solutions to these problems in an intercooling heat exchanger that is intended to be located internally within a rotary compressor machine.

SUMMARY OF THE INVENTION

It is the principal object of the invention to provide a new and improved rotary compressor machine with intercooling for use in cooled, compressed air. More specifically, it is the object of the invention to provide an improved rotary compressor machine with an internal inter-cooler that is more compact than known such systems, that is easily serviced, and/or which requires a minimum of plumbing connections and which maximizes the efficiency of the air cooling process.

According to one facet of the invention, an exemplary embodiment thereof achieves one or more of the above objects in a rotary machine that includes a rotatable shaft having at least one compressor wheel thereon and a housing containing the compressor wheel and having an inlet to the compressor wheel and an outlet. A heat exchanger is disposed in the housing and is located between the compressor wheel and the outlet. The heat exchanger includes a core having a gas flow path with a substantial radial extent and a gas inlet in fluid communication with the compressor wheel and a gas outlet in fluid communication with the housing outlet. A coolant flow path is provided in the heat exchanger in heat exchange relation with the gas flow path and has a substantial axial extent. The heat exchanger has a donut-shaped core containing the flow paths, the core being substantially concentric with the shaft. The core is flanked by axially spaced, donut-shaped tanks with one such tank serving as a boundary for compressed air being discharged by the compressor wheel as it moves in a radially outward direction. The invention contemplates that the tank be thermally conductive and that the usual deswirling vanes mounted in this area near the outlet of the compressor wheel be thermally bridged to such tank so that, in addition to providing the usual deswirling function, the vanes further act as fins to which heat of the compressed air may be rejected to ultimately be conducted through the tank to coolant therein to thereby increase the transfer of heat from the compressed gas to the coolant.

In a preferred embodiment, the vanes are part of a metallic vane structure which is metallurgically bonded to the tank.

In a highly preferred embodiment, the rotary machine is a turbocharger or a supercharger and the heat exchanger serves as an inter-cooler for combustion air.

In one embodiment of the invention, the vane structure comprises a plurality of circumferentially spaced vanes bonded to the tank.

The invention contemplates that the heat exchanger has a radially outer periphery spaced inwardly of the housing and the core has a gas inlet at the radially outer periphery to receive the discharged gas after the same has passed through the vane structure.

Other objects and advantages will become apparent from the following specification taken in connection with the accompanying drawings.

DESCRIPTION OF THE PREFERRED EMBODIMENTS

The exemplary embodiments of the invention described herein are specifically disclosed as combustion air chargers such as a turbo-charger in the form of a two stage turbocharger. However, it is to be understood that this description is for exemplification purposes and no restriction to combustion air chargers or to turbochargers or to a number of stages as intended except insofar as stated in the appended claims. For example, the invention may be employed with efficacy in any type of rotary machine having a rotary compressor wheel wherein it is desired to cool the compressed air discharged by the compressor wheel before being employed in some other operation. The invention may be employed with efficacy in single stage turbochargers as well as multiple stage turbochargers and may be employed in single or multiple stage superchargers as well.

Figure 1:
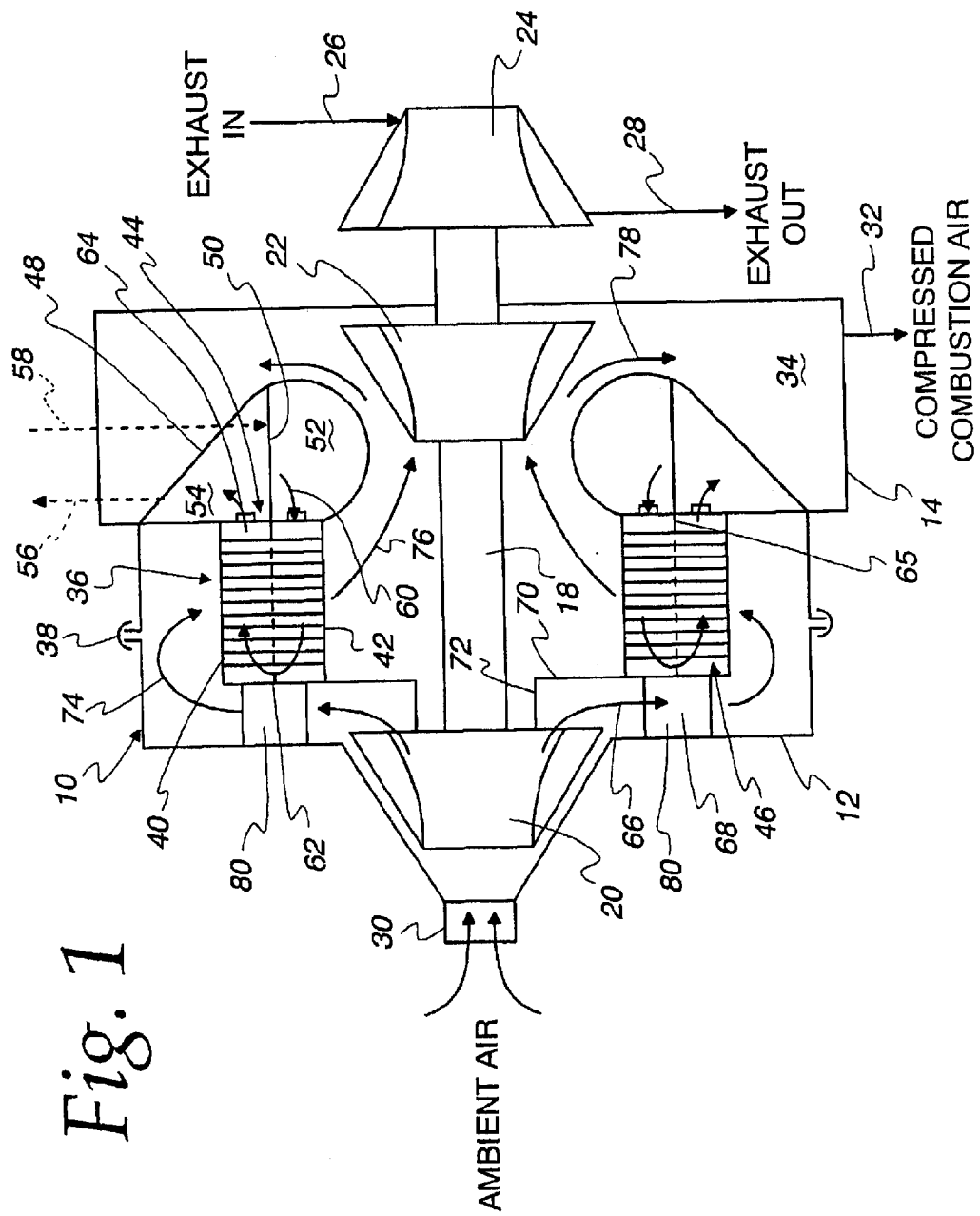
FIG. 1 is a somewhat schematic, sectional view of a rotary machine, specifically a turbocharger, made according to the invention.

With the exception of the use of deswirling vanes in connection with a compressor wheel which are thermally bridged to a tank for a heat exchanger, no limitation to a particular type of heat exchanger is intended. However, for details of a heat exchanger construction intended for use in a rotary machine employed as a turbocharger or a supercharger, reference may be had to the copending, commonly assigned application of Meshenky et al, entitled "Internally Mounted Radial Flow Intercooler for a Combustion Air Charger", filed Sep. 20, 2002, Ser. No. 10/251,537, the entire disclosure of which is herein incorporated by reference. With the foregoing in mind, attention is directed to FIG. 1 wherein the rotary machine of the invention is illustrated as a two stage turbocharger for the purposes of illustrating an exemplary embodiment of the invention.

The illustrated embodiment of the invention is seen to include a housing, generally designated 10, formed of at least two separable sections, 12 and 14 respectively. Journalled within the housing 10 by suitable bearings (not shown) is a rotary shaft 18. In the illustrated embodiment, the rotary shaft mounts a first compressor wheel 20, a second compressor wheel 22 and turbine wheel 24 which, in turn, will be located within a housing (not shown). As indicated by an arrow 26, the turbine wheel 24 is driven by the exhaust from an internal combustion engine to drive the shaft 18. Spent exhaust is outletted from the turbine wheel 24 as indicated by arrow 28.

The housing 12 includes an ambient air inlet 30 while the housing 14 includes a compressed air outlet, schematically indicated by an arrow 32. The inlet 30 is to the inlet side of the compressor wheel 20 while the outlet 32 is from a volute, schematically illustrated at 34, on the outlet side of the compressor wheel 22.

A heat exchanger made according to the invention, generally designated 36, is contained within the housings 12, 14 where the two are joined together as indicated schematically by removable fasteners 38. The heat exchanger 36 is donut-shaped or ring-shaped and includes a radially outer cylindrical surface 40 which defines an air inlet for the passage of air through the heat exchanger 36. A radially inner cylindrical surface 42 forms an air outlet for the heat exchanger 36.

The sides of the heat exchanger are provided with a first inlet/outlet header and tank, generally designated 44 on the side of the heat exchanger 36 located within the housing 14 and a redirecting header and tank, generally designated 46, on the side of the heat exchanger 36 within the housing 12. A coolant manifold 48 is located within the housing 14 to one side of the volute 34 and radially inward of the radially outer part of the volute 34. The manifold 48 is divided by an internal web or baffle 50 into a radially inner manifold section 52 and a radially outer manifold section 54. The system is provided with a coolant inlet schematically illustrated by an arrow 56 which extends to radially inner manifold section 52 and a coolant outlet schematically illustrated by an arrow 58 which extends to the radially outer manifold section 54. By a construction to be described in greater detail hereinafter, a coolant, such as coolant for the internal combustion engine, enters the turbocharger through the inlet 56 and is passed to the radially inner manifold section from which it flows into the inlet/outlet header and tank 44 at a radially inner part thereof to flow axially through the heat exchanger 36 to the reentrant header and tank 46 where its direction is reversed to flow through the radially outer part of the heat exchanger 36 back to the inlet/outlet header and tank 44. From the header and tank 44, the coolant is discharged into the radially outer manifold section 54 to the coolant outlet 58. This flow of coolant is indicated by a series of arrows 60, 62 and 64. A baffle 65 in the inlet/outlet header and tank 44 maintain separation of the incoming and outgoing coolant flow.

Air flow through the turbocharger is as follows. Ambient air enters in the inlet 30 and passes to the inlet side of the compressor wheel 20. As the compressor wheel 20 is driven by the turbine wheel 24, the air is compressed and discharged at an elevated pressure on the radially outer periphery of the compressor wheel 20 as indicated by arrows 66. The compressed air continues to flow radially outwardly through an annular space 68 between the housing 12 and the heat exchanger 36 which is in part defined by the reentrant header and tank 46, a radial baffle 70 extending radially inwardly from the reentrant header and tank 46 and an axial baffle 72 which extends from the baffle 70 at its radially innermost part to mount on a part of the housing 12 (not shown) in adjacency to the turbine wheel 20.

The radially outer side or periphery 40 of the heat exchanger 36 is spaced radially inwardly from the housings 12 and 14 allowing the air compressed by the turbine wheel 20 to be redirected as indicated by arrows 74 to enter the heat exchanger 36 at the radially outer periphery 40 thereof. The air then passes through the heat exchanger 36 in a radially inward direction and is cooled by the coolant that flows axially through the heat exchanger 36 as mentioned earlier. The cooled, compressed air is then discharged from the heat exchanger 36 as indicated by arrows 76 to the inlet side of the compressor wheel 22 whereat it is further compressed and then discharged into the volute 34 as indicated by arrows 78. This compressed air is then discharged as compressed combustion air to the internal engine to support combustion therein. If desired, additional cooling stages could be included between the compressor wheel 22 and the engine. Alternatively, as mentioned previously, in a single stage turbocharger, the compressor wheel 22 can be omitted in which case the air being discharged from the radially inner side of periphery 42 of the heat exchanger 36 could be discharged directly into the volute 34.

It will be appreciated that much of the plumbing for both air and coolant is contained within the turbocharger itself, providing a compact assembly and minimizing piping losses. For example, large diameter, external hoses connecting the compressor to an external heat exchanger are completely avoided.

Figure 2:
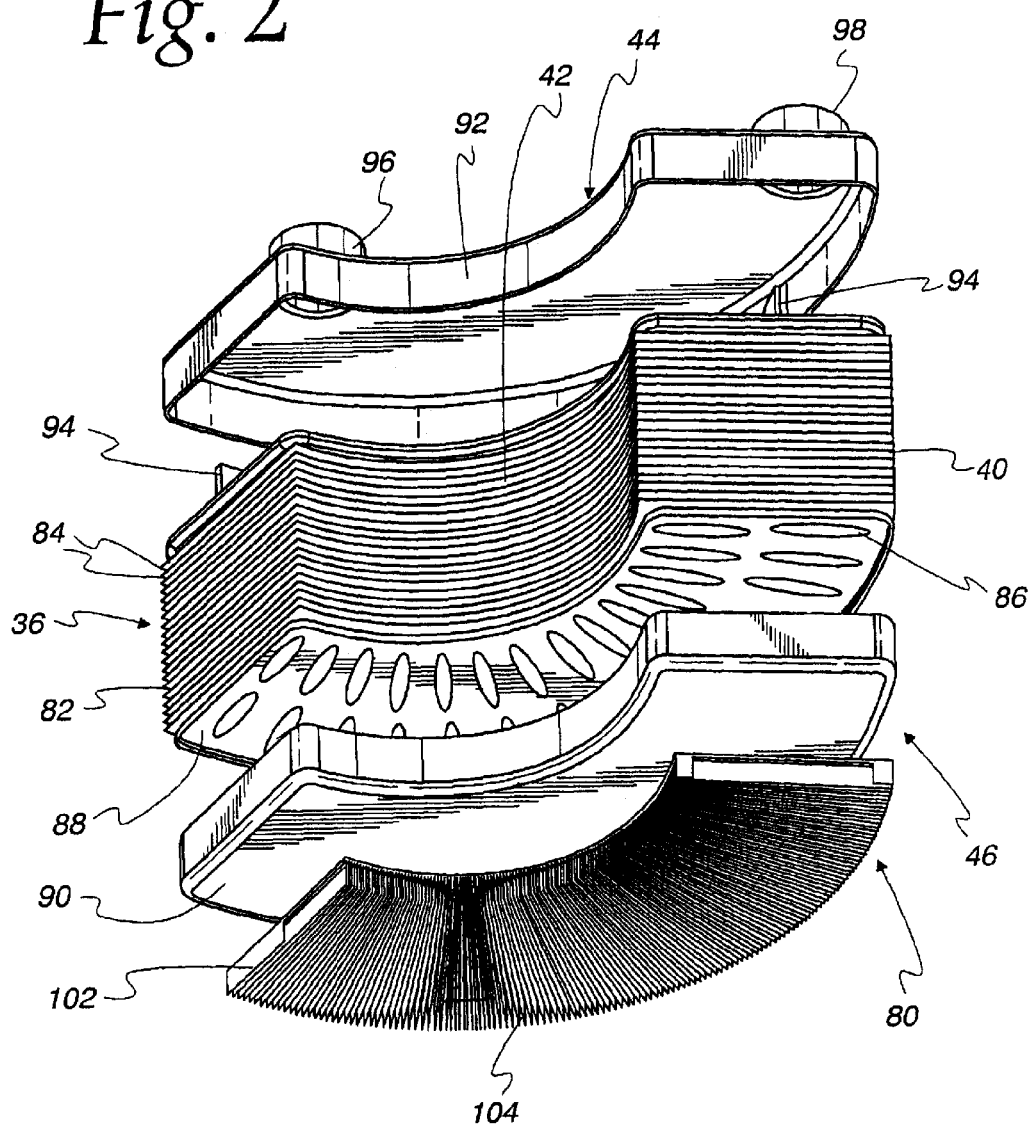
FIG. 2 is an exploded view of a segment of the heat exchanger made according to the invention.
Figure 3:
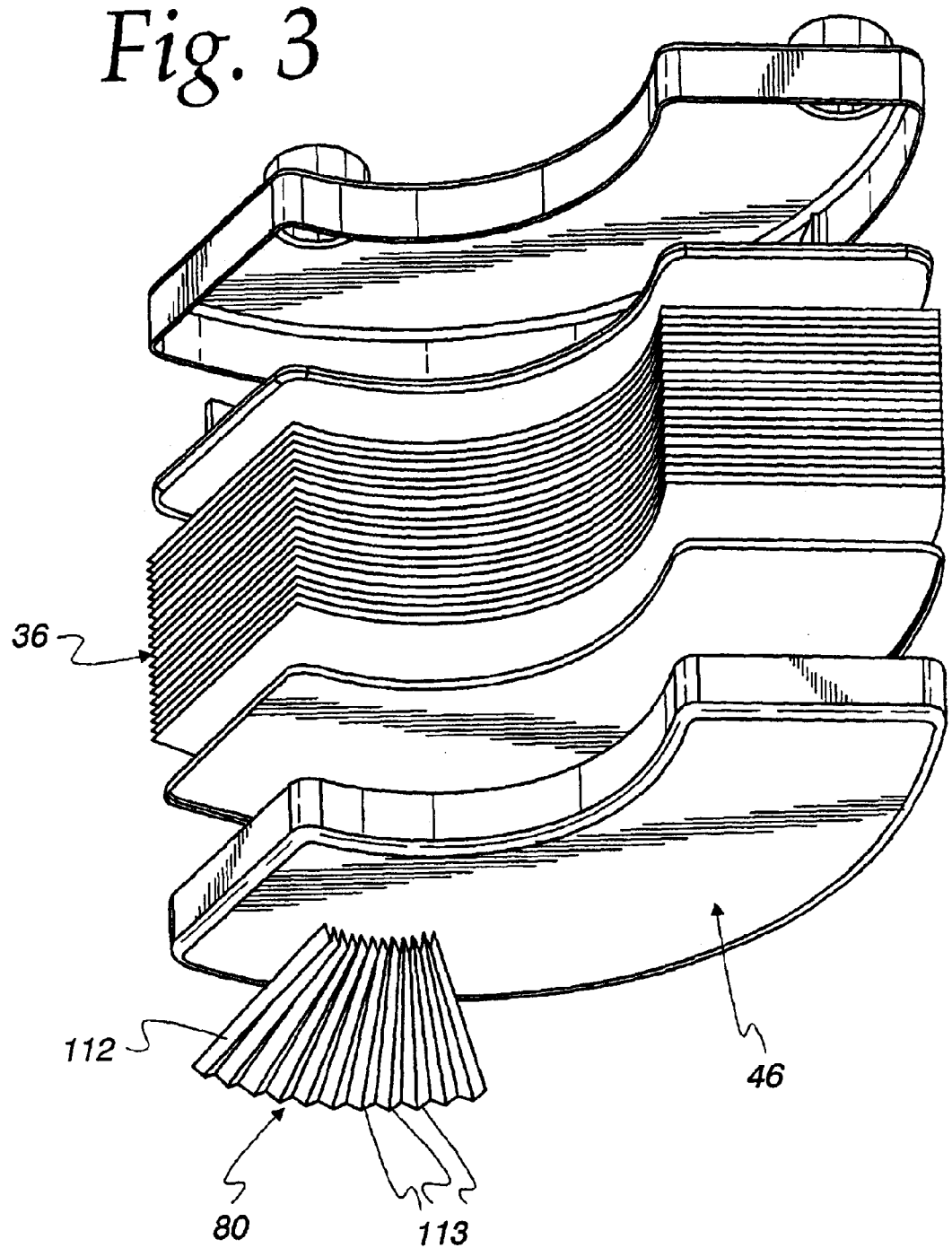
FIG. 3 is an exploded view similar to FIG. 2 showing an additional embodiment of the invention.

As is well known, deswirling vanes are frequently located in an annular array within the space 68 whereat the gas discharged by the compressor wheel 20 is moving generally radially outwardly. Because of the rotary motion of the compressing wheel 20, a swirling motion is also imparted to the compressed gas and in many applications, it is desirable that the swirling motion be minimized or eliminated and deswirling vanes 80 are provided for this purpose. Turning now to FIGS. 2 and 3, and with specific reference to FIG. 2, the heat exchanger 36 is seen to include a core 82 made up of a plurality of fins 84 through which a plurality of tubes 86 extend to be received in tube slots (not shown) in spaced header plates 88, only one of which is shown.

One header plate 88 forms part of the reentrant header and tank assembly 46 and has a metallic tank 90 sealed thereto about a periphery of the header plate 88 to provide a coolant receiving compartment. A tank 92, forming part of the inlet/outlet header and tank 44 is abutted and sealed to the other header plate 88 on the side of the core 82 opposite from that shown. The baffle 65 is located on the header plate 88 associated with the inlet/outlet header and tank 44 and is intended to abut the latter to separate two ports 96 and 98 to opposite sides of the manifold 48.

The deswirling vane structure 80 includes a plurality of generally radially extending vanes 102 in closely spaced relation and is thermally bridged to the tank 90, typically by brazing the vane assembly 80 to the same. The configuration of the vanes 102 may be in any desired form so as to provide the desired flow characteristics and flow path at the radially outer extremity 104 of the vanes 102.

In FIG. 2, the heat exchanger 36 is shown only as a single segment, there being two additional such segments to form the cylindrical heat exchanger. However, the same may be made in one piece if desired as, for example, as shown in the previously identified application of Meshenky et al.

FIG. 3 is a view similar to FIG. 2 and common components will not be redescribed and the tubes are not shown for simplicity.

In FIG. 3, another construction of the vane assembly 80 is shown. The vane assembly 80 may be in the shape of a convoluted fan 112, formed by stamping or the like and is likewise thermally bridged to the tank 90 as by brazing or the like.

The fan 112 thus defines a plurality of interconnected vanes 113.

In some instances, the vane structure 80 is made up of separate vanes 116 having desired aerodynamic shapes to provide the desired flow pattern. These are shown in the lower portion of FIG. 4 and the individual vanes 116 are in spaced relation and again in thermally bridged to the tank 90.

Figure 4:
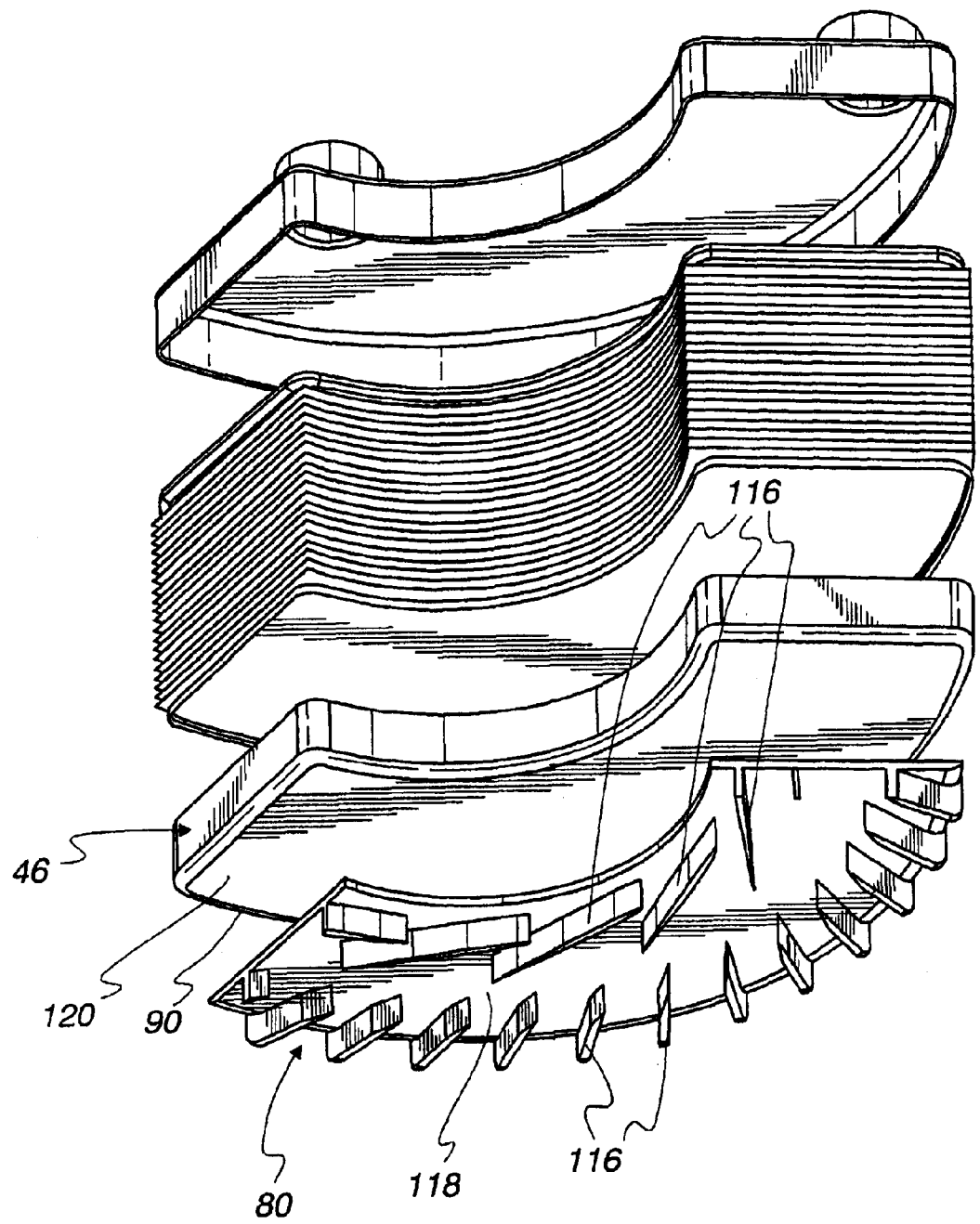
FIG. 4 is an exploded view similar to FIGS. 2 and 3 showing still a further embodiment of the invention.

Specifically, as seen in FIG. 4, the vanes 116 are mounted on or integral with a plate 118 which, in turn is thermally bridged to the tank as by brazing. However, it would also be possible to braze the vanes 116 directly to the tank 90 or even machine the vanes out of the wall 120 of the tank 90 opposite the header plate 88 (not shown in FIG. 4).

In all cases, the vane assembly 80 are preferably formed of metal for good thermal conductivity and to assure that they may be bonded to the tank 90 so that when the heat exchanger is installed in the rotary machine, the vanes will occupy the space 68 to provide the desired deswirling action.

Finally, in multiple stage machines, compressor vanes for a stage subsequent to the first stage may be mounted on the inlet/outlet header and tank 44 if desired, simply by reconfiguring the manifold 48.

Those skilled in the art will appreciate from the foregoing description that heat exchange is enhanced according to the invention in that coolant will be present within the tank 90 during operation of the machine while the vane assembly 80 will be located within the space 68 (FIG. 1) to have the gas flow radially outwardly therethrough and be deswirled thereby. In addition, because of the good thermal conductivity of the metal tank 90 as well as the thermal conductivity of vane assembly 80, heat from the compressed gas being discharged from the compressor wheel 20 (FIG. 1) will be rejected to the vane assembly 80 to be conducted to the tank 90 and thus to the coolant contained therein. Thus, the vane assembly acts as fins to increase the surface area on the gas side of the heat exchanger 36 to supplement the cooling that occurs within the core 82. As a result, the compressed gas is cooled to a lower temperature than would otherwise be the case and is more dense when it passes out of the heat exchanger 36 at the radially inner periphery 42 thereof. In the case of a combustion air charger, this means that a given volume of combustion air will contain more oxygen, and thereby provide more oxygen to support combustion within an engine with which the machine is associated. This provides for improved power output of such an engine. In other rotary machines, the increased densification of the gas can reduce pressure losses within the heat exchanger 36 to improve overall cycle efficiency.

Thus, through the simple expedient of employing the vane assembly 80 for both deswirling and thermal cooling purposes, improved efficiency is obtained.

What is claimed is:

1. A rotary machine having a rotary shaft mounting a compressor wheel, a housing containing the compressor wheel, a gas inlet in said housing communicating with one end of the compressor wheel, an annular, radially extending space within said housing at an opposite end of said compressor wheel; a donut-shaped heat exchanger within said housing having a core with a central opening in surrounding relation to said shaft and a coolant tank on one side of and in fluid communication with the core, said coolant tank characterized by serving as one boundary of said radially extending space; and a deswirling vane structure within said radially extending space for causing gas discharged by said compressor wheel to move radially outward within said space, said vane structure being formed of a material of good thermal conductivity and thermally bridged to said tank to conduct heat thereto to be rejected to coolant in said tank whereby said vane structure acts to (a) perform a deswirling function on said discharged gas and (b) provide a thermally conductive path for heat rejection from said discharged gas to coolant within said tank.

2. The rotary machine of claim 1 wherein said vane structure comprises a plurality of circumferentially spaced vanes bonded to said tank.

3. The rotary machine of claim 1 wherein said heat exchanger has a radially outer periphery spaced inwardly of said housing and said core has a gas inlet at said radially outer periphery to receive said discharged gas after the same has passed through said vane structure.

4. The rotary machine of claim 1 wherein said tank and said vane structure are metallic and are metallurgically bonded to one another.

5. The rotary machine of claim 4 wherein said rotary machine is a turbocharger or a supercharger and said heat exchanger serves as an intercooler for combustion air.

6. A rotary machine having a rotary shaft mounting a compressor wheel, a housing containing the compressor wheel, a gas inlet in said housing communicating with one end of the compressor wheel, an annular, radially extending space within said housing at an opposite end of said compressor wheel; a donut-shaped heat exchanger within said housing having a core with a central opening in surrounding relation to said shaft and a coolant tank on one side of and in fluid communication with the core, said core having a radially outer peripheral inlet spaced inwardly of said housing; and a plurality of metallic vanes within said radially extending space for causing gas discharged by said compressor wheel to move radially outward in a predetermined flow pattern to said peripheral inlet, and characterized by said coolant tank serving as one boundary of said radially extending space, and said vanes being metallurgically bonded to said tank to form a thermally conductive path for heat rejected by said discharged gas to coolant within said tank.

7. The rotary machine of claim 6 wherein said plurality of vanes form part of a vane assembly metallurgically bonded to said tank.

8. The rotary machine of claim 6 wherein said plurality of vanes are individual vanes, each metallurgically bonded to said tank.

* * * * *